United States Patent
Govekar

(10) Patent No.: US 7,310,964 B2
(45) Date of Patent: Dec. 25, 2007

(54) REFRIGERANT CHARGING USING LINE HAVING A CONTROL VALVE

(75) Inventor: Craig F. Govekar, Gurnee, IL (US)

(73) Assignee: Snap-On Incorporated, Pleasant Prairie, WI (US)

( * ) Notice: Subject to any disclaimer, the term of this patent is extended or adjusted under 35 U.S.C. 154(b) by 65 days.

(21) Appl. No.: 11/108,692

(22) Filed: Apr. 19, 2005

(65) Prior Publication Data

US 2006/0230775 A1    Oct. 19, 2006

(51) Int. Cl.
*F25B 45/00* (2006.01)

(52) U.S. Cl. .............................. 62/292; 62/77

(58) Field of Classification Search ................. 66/77, 66/149, 292, 475
See application file for complete search history.

(56) References Cited

U.S. PATENT DOCUMENTS

| 5,293,902 | A | * | 3/1994 | Lapierie | ............... 137/614.04 |
| 5,797,717 | A | * | 8/1998 | Tanaka et al. | ................. 417/14 |
| 6,273,397 | B1 | * | 8/2001 | Schultz et al. | ........... 251/149.6 |
| 6,354,100 | B1 |   | 3/2002 | Spanos et al. | |
| 2001/0025496 | A1 | * | 10/2001 | Bimboes et al. | ................ 62/77 |
| 2004/0079092 | A1 | * | 4/2004 | Ferris et al. | .................... 62/77 |

FOREIGN PATENT DOCUMENTS

| DE | 38 00 088 A1 | 7/1988 |
| JP | 2004-190894 A | 7/2004 |
| WO | WO 2006/055092 A1 | 5/2006 |

OTHER PUBLICATIONS

International Preliminary Report on Patentability issued in International Application No. PCT/US2006/011452, dated Mar. 15, 2007.

* cited by examiner

*Primary Examiner*—Melvin Jones
(74) *Attorney, Agent, or Firm*—McDermott Will & Emery LLP

(57) ABSTRACT

A charging system for charging a refrigeration system of a vehicle includes a refrigerant source, a coupler, a line, and a control valve. The coupler is adapted for connection to a connection point on the refrigeration system. The line fluidly connects the refrigerant source to the coupler, and the control valve is disposed proximate the coupler to control flow of the refrigerant from the line through the coupler and into the refrigeration system. The control valve may be integral with the coupler. A scale is used to measure an amount of refrigerant being discharged from the coupler, and a controller is connected to the scale and the control valve. Actuation of the control valve is controlled by the controller based upon an initial weight and a measured weight of the refrigerant source from the scale.

11 Claims, 2 Drawing Sheets

REFRIGERANT CHARGING USING LINE HAVING A CONTROL VALVE

TECHNICAL FIELD

The disclosure relates to a system and method of charging air conditioning and refrigeration systems or units, such as those used in automobiles, boats or ships, or other types of vehicles.

BACKGROUND ART

Most refrigeration systems are not 100% free of leaks. Thus, the amount (or mass) of refrigerant within the refrigeration system decreases over time. Refrigeration systems, however, are designed to operate with a specific amount of refrigerant. Therefore, loss of refrigerant in a refrigeration system over time typically reduces the efficiency of the refrigeration system. Also, if the amount of refrigerant in the refrigeration system drops to a certain level, the refrigeration system may cease to operate and/or be damaged. For these reasons, a common maintenance operation for a refrigeration system is to recharge the refrigerant.

The recharging operation typically involves evacuating the refrigeration system of any remaining refrigerant and, if present, other materials. Once the refrigeration system is evacuated, a predetermined amount of new refrigerant is re-introduced. A refrigerant source, typically a large tank of refrigerant, is connected to the refrigeration system of a vehicle through a line. The tank includes a control valve where the line connects to the tank, and introduction of refrigerant into the refrigeration system is controlled by the control valve on the tank.

This conventional charging system, however, suffers from several problems. A refrigeration system is designed to operate with a specific amount of refrigerant, and too little or too much refrigerant can reduce the effectiveness of the recharging operation. For example, the amount of refrigerant that leaves the refrigerant source (i.e., tank) may not be equal to the amount of refrigerant that is introduced into the refrigeration system because a certain amount of the refrigerant remains in the line between the refrigerant source and the refrigeration system. Depending upon the length of the line and the temperature and pressure of the refrigerant in the line, the amount of refrigerant within the line may vary. Thus, a technician is not able to accurately and consistently determine the amount of refrigerant being introduced into the refrigeration system based upon a measurement of refrigerant leaving the refrigerant source.

Another issue with a conventional charging system is that once the line is disconnected from the refrigeration source, any refrigerant within the line is evacuated into the atmosphere. Depending upon type of refrigerant, this can be both wasteful and hazardous. Furthermore, recent advances in refrigeration technology employ carbon dioxide as the refrigerant, which is stored at a pressure as much as ten times higher than the pressure at which conventional refrigerants are stored; and because of the high pressure, the release of any gas remaining within the line into the atmosphere can be dangerous. There is, therefore, a need for a refrigerant charging system and method that is more accurate, safer, and less wasteful than conventional refrigeration charging systems, particularly when the refrigerant is carbon dioxide.

SUMMARY OF THE DISCLOSURE

The present disclosure provides an example of a system and method of charging refrigeration systems or units.

In one aspect, a charging system is provided for charging a refrigeration system of a vehicle. The charging system includes a refrigerant source, a coupler, a line, and a control valve. The coupler is adapted for connection to a connection point on the refrigeration system. The line fluidly connects the refrigerant source to the coupler, and the control valve is disposed proximate the coupler to control flow of the refrigerant from the line through the coupler and into the refrigeration system. The control valve may be integral with the coupler. The refrigerant may be carbon dioxide.

In another aspect, a scale is used to measure an amount of refrigerant being discharged from the coupler, and a controller is connected to the scale and the control valve. The controller causes the charging system to perform the steps of obtaining an initial weight of the refrigerant source prior to opening the connection valve and after refrigerant has been introduced into the line; opening the connection valve to introduce refrigerant from the line into the refrigeration system; obtaining a new weight of the refrigerant source after opening the connection valve; comparing the initial weight to the new weight; and closing the connection valve after a desired amount of refrigerant has been introduced into the refrigeration system.

Other aspects and advantages of the present disclosure will become apparent to those skilled in this art from the following description of preferred aspects taken in conjunction with the accompanying drawings. As will be realized, the disclosed concepts are capable of other and different embodiments, and its details are capable of modifications in various obvious respects, all without departing from the spirit thereof. Accordingly, the drawings, disclosed aspects, and description are to be regarded as illustrative in nature, and not as restrictive.

BRIEF DESCRIPTION OF THE DRAWINGS

The foregoing and other features, aspects and advantages of the present concepts are described in the following detailed description which examples are supplemented by the accompanying drawings, in which.

DETAILED DESCRIPTION OF THE PREFERRED EMBODIMENTS

Figure 1:
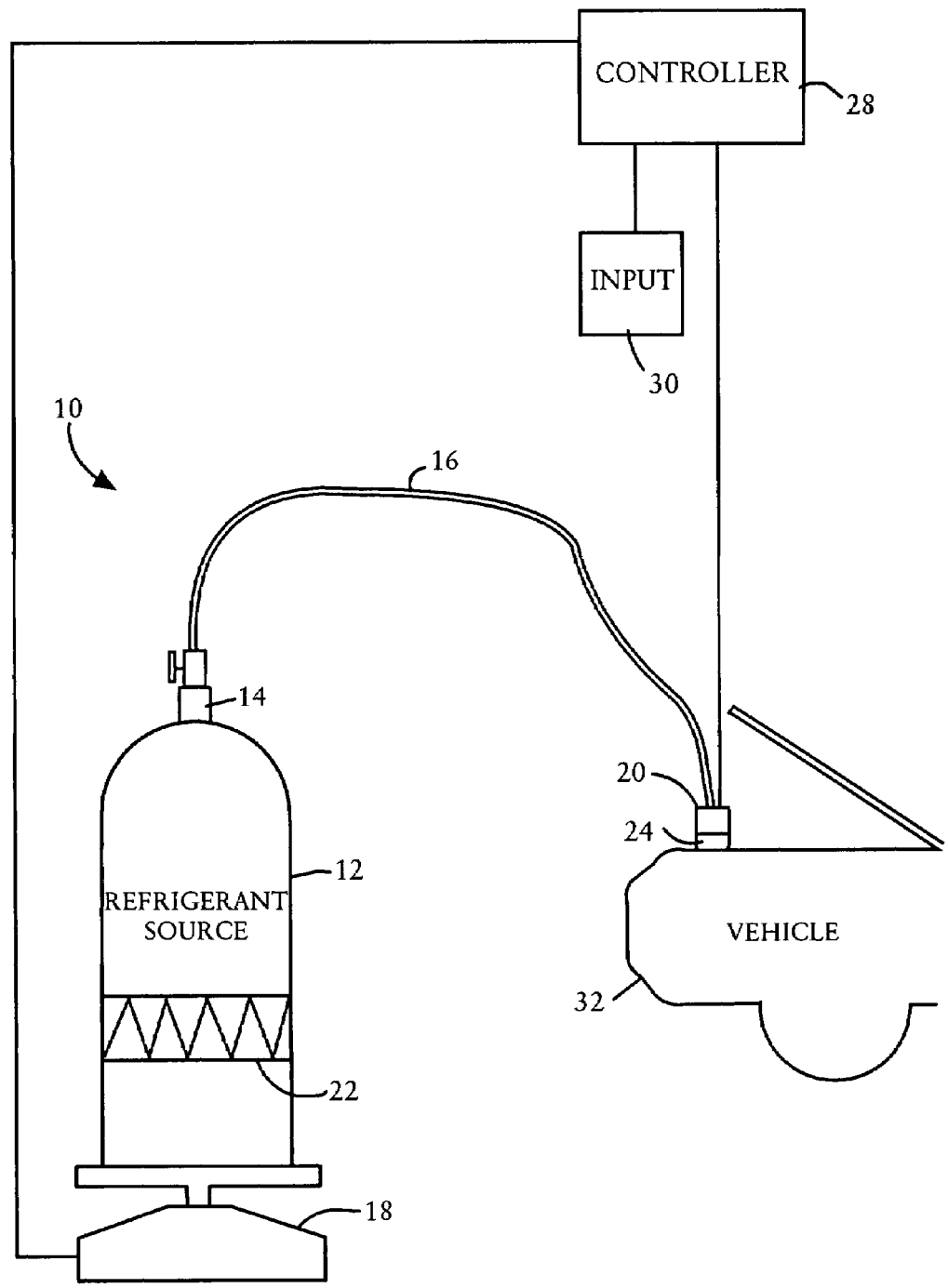
FIG. 1 shows an example of a charging system, according to the disclosure.

In accord with the disclosed concepts, there is provided, as shown in FIG. 1, a charging system 10 for charging a refrigeration system of a vehicle 32, such as an automobile. The charging system 10 includes a refrigerant source 12, a refrigerant measurement device 18, a controller 28, and one or more control valves 14, 20. The controller (or computer) 28 may include a processor, a memory device, a display device, and an input device 30.

The refrigerant source 12 includes a refrigerant, such as carbon dioxide, and the refrigerant measurement device 18 determines an amount of refrigerant that exits the refrigerant source 12. The charging system 10 is not limited as to a particular type of refrigerant measurement device 18; however, a scale 18 may be employed to measure weight of the refrigerant source 12. The weight measured by the scale 18 may be output to the controller 28. A line 16, or optionally more than one line, depending upon the configuration of the charging system 10, may be provided with a conventional coupler 24 for connection, at one end, to a connection point on a refrigeration system of the vehicle 32.

A control valve 24 is disposed proximate the coupler 24. Additionally, the control valve 24 may be integral with the coupler 24. The coupler 24 is positioned at the distal end of the line 16 and is configured to be attached to a connection point on the refrigeration system of the vehicle. As shown in FIG. 1, actuation of the control valve 24 may be controlled by signals output from the controller 28. Alternatively, the control valve 24 may be manually actuated.

Figure 2:
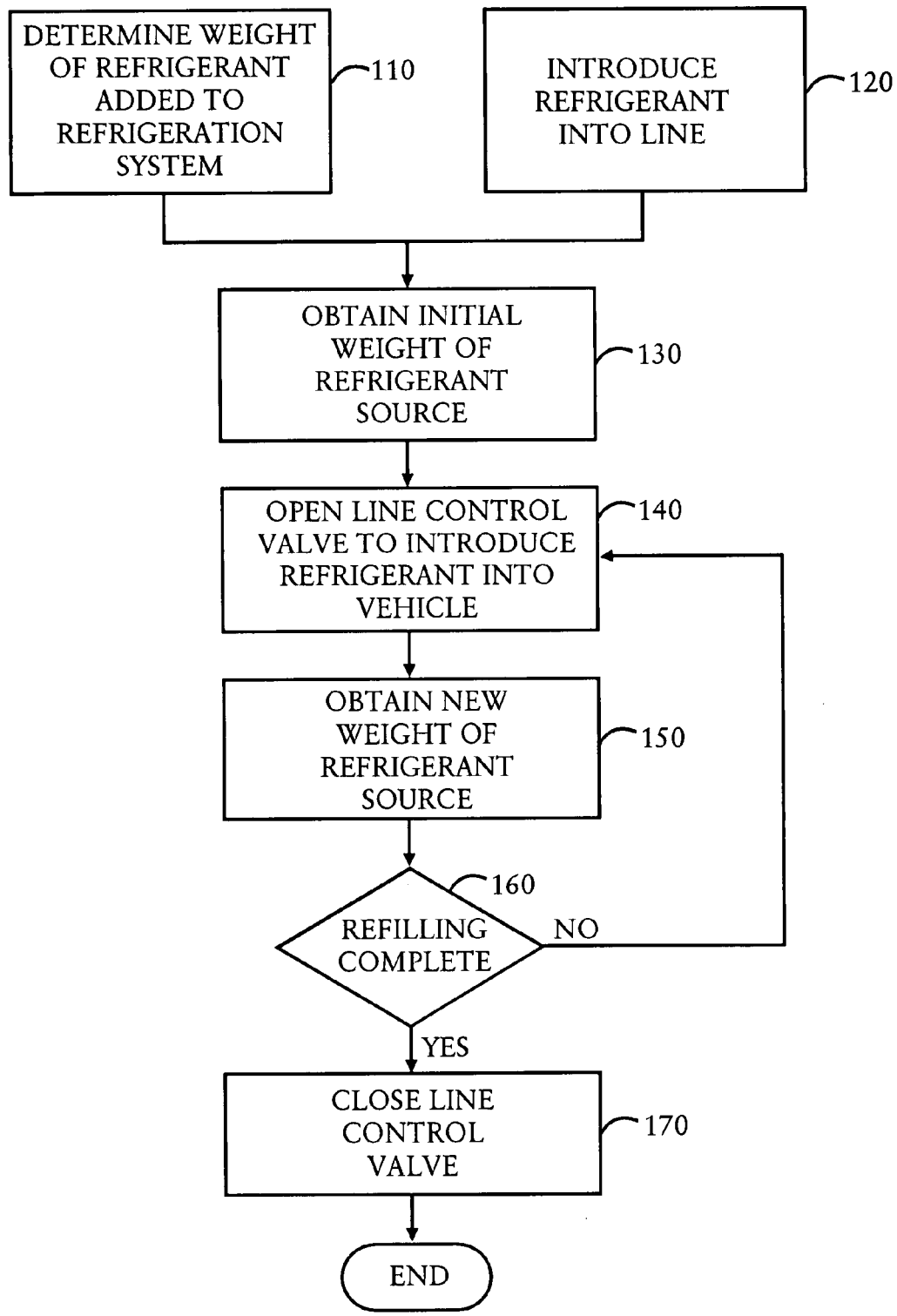
FIG. 2 is a flow chart of a method of charging a refrigeration system, according to the disclosure.

A method of operating the charging system is illustrated in FIG. 2. For example, the controller 28 includes an executable instruction set arranged, when executed by the processor, to cause the processor to perform the steps of: (1) establishing an initial weight of the refrigerant source 12 after refrigerant has been introduced into the line 16; (2) controlling the control valve 24 to input refrigerant into the refrigeration system; (3) receiving a desired weight of refrigerant to be introduced into the refrigeration system; (4) reweighing the refrigerant source 12; (5) comparing the change in weight of the refrigerant source 12 to the desired weight of refrigerant to be introduced into the refrigeration system; and (6) controlling the control valve 24 to halt the input of refrigerant into the refrigeration system after the change in weight of the refrigerant source 12 equals or exceeds the desired weight of refrigerant by some predetermined margin. Additional steps may be included before or after any of the aforementioned steps.

The operations of the refrigerant charging system 10 is schematically illustrated in the flow chart of FIG. 2. In an initial step 110, a required amount (mass) of refrigerant to be charged into the refrigeration system of the vehicle is determined. Many techniques of determining the mass of refrigerant to be introduced into a refrigeration system are well known in the art, and the present methodology of charging a refrigeration system is not limited to any particular technique. For example, after flushing the refrigeration system of any remaining refrigerant, which may involve discharging any remaining refrigerant and pulling a vacuum within the refrigeration system, the mass of new refrigerant to be introduced into the refrigeration system is determined. A technician may physically look up the value in an electronic or hardcopy database, by a microprocessor (e.g., a shop computer, a handheld processing device, or a microprocessor connected to the charging equipment) accessing (e.g., downloading or uploading) the information from a local or remote memory following input of information uniquely identifying the refrigeration unit or class of refrigeration unit. Alternatively, the technician may even rely on his or her expertise to determine the amount of new refrigerant to be added.

In step 120, refrigerant is introduced into the line 16 prior to opening the control valve 20 positioned at an inlet to the refrigeration system. After the line 16 has been filed with refrigerant, in step 130, an initial weight of the refrigerant source 12 is determined using the scale 18.

In step 140, a mass of refrigerant is introduced from the refrigerant source 12 into the refrigeration system of the vehicle 20 via the line 16 by opening the control valve 24. During the introduction of refrigerant from the refrigerant source 12 into the refrigeration system of the vehicle 20, in step 150, the weight of the cartridge 14 is measured again using the scale 18.

In step 160, the newly measured weight of the refrigerant source 12 is then compared to the initial weight of the refrigerant source 12 to determine the amount of refrigerant that has been added to the refrigeration system of the vehicle 32. When the actual weight of refrigerant added (initial weight of refrigerant source 12 minus measured weight of refrigerant source 12) equals the desired weight of the refrigerant to be added to the vehicle 32, in step 170, the line 16 is fluidly disconnected from the refrigeration system of the vehicle 32 by closing the control valve 20, and the entire process may be repeated to charge a refrigeration system of another vehicle.

If, after comparing the initial weight of the refrigerant source 12 to the measured weight of the refrigerant source 12, the desired weight of refrigerant has not been added from the refrigerant source 12 to the refrigeration system of the vehicle 20, steps 140, 150, and 160 are repeated. Through use of the present refrigerant charging system, refrigerant can be charged into a refrigeration system with comparable or improved accuracy than prior technology used for the same purpose.

The disclosed concepts may be practiced by employing conventional methodology and equipment. Accordingly, the details of such equipment and methodology are not set forth herein in detail. In the previous descriptions, numerous specific details are set forth, such as specific formulas, processes, techniques, etc., in order to provide a thorough understanding of the present invention. However, it should be recognized that the present invention may be practiced without resorting to the details specifically set forth.

Only an exemplary aspect of the present disclosure and but a few examples of its versatility are shown and described. It is to be understood that the present invention is capable of use in various other combinations and environments and is capable of changes or modifications within the scope of the inventive concept as expressed herein.

What is claimed is:

1. A charging system for charging a refrigeration system of a vehicle, comprising:
   a refrigerant source;
   a coupler adapted for connection to a connection point on the refrigeration system;
   a line connecting the refrigerant source to the coupler; and
   a control valve disposed proximate the coupler actuatable to control flow of the refrigerant from the line through the coupler and into the refrigeration system while the coupler is connected to the connection point;
   wherein the control valve is integral with the coupler.

2. The charging system according to claim 1, further comprising a controller connected to, and for controlling actuation of, the control valve.

3. The charging system according to claim 1, wherein the refrigerant is carbon dioxide.

4. The charging system according to claim 1, further comprising a refrigerant measuring device for measuring an amount of refrigerant being discharged from the coupler.

5. A charging system for charging a refrigeration system of a vehicle, comprising:
   a refrigerant source;
   a coupler adapted for connection to a connection point on the refrigeration system;
   a line connecting the refrigerant source to the coupler;

a control valve disposed proximate the coupler to control flow of the refrigerant from the line through the coupler and into the refrigeration system; and a refrigerant measuring device for measuring an amount of refrigerant being discharged from the coupler;

wherein the refrigerant measuring device is a scale for measuring a weight of the refrigerant source.

6. The charging system according to claim 5, further comprising a controller connected to, and for controlling actuation of, the control valve based upon an initial weight and a measured weight of the refrigerant source from the scale.

7. The charging system according to claim 6, wherein the controller includes an instruction set which, when executed by the controller, causes the charging system to perform the steps of:

obtaining an initial weight of the refrigerant source prior to opening the connection valve and after refrigerant has been introduced into the line;

opening the connection valve to introduce refrigerant from the line into the refrigeration system;

obtaining a new weight of the refrigerant source after opening the connection valve;

comparing the initial weight to the new weight; and closing the connection valve after a desired amount of refrigerant has been introduced into the refrigeration system.

8. A method for charging a refrigeration system of a vehicle, comprising the steps of:

connecting a coupler to a connection point on the refrigeration system, the coupler connected to a line fluidly connecting the coupler to a refrigerant source;

introducing refrigerant into the line prior to opening a connection valve disposed proximate to the coupler;

opening the connection valve to introduce refrigerant from the line into the refrigeration system;

closing the connection valve after a desired amount of refrigerant has been introduced into the refrigeration system;

obtaining an initial weight of the refrigerant source prior to opening the connection valve;

obtaining a new weight of the refrigerant source after opening the connection valve; and comparing the initial weight to the new weight.

9. The method according to claim 8, wherein the connection valve is closed when a difference between the initial weight and the new weight equals the desired amount of refrigerant.

10. The method according to claim 8, wherein the control valve is integral with the coupler.

11. The method according to claim 8, wherein the refrigerant is carbon dioxide.

* * * * *